United States Patent
Zhu et al.

(10) Patent No.: US 11,445,430 B2
(45) Date of Patent: Sep. 13, 2022

(54) DATA FORWARDING METHOD AND APPARATUS

(71) Applicant: HUAWEI TECHNOLOGIES CO., LTD., Guangdong (CN)

(72) Inventors: Yuanping Zhu, Shanghai (CN); Yada Huang, Shanghai (CN); Jing Liu, Shanghai (CN); Mingzeng Dai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/729,862

(22) Filed: Dec. 30, 2019

(65) Prior Publication Data

US 2020/0137659 A1  Apr. 30, 2020

Related U.S. Application Data

(63) Continuation of application No. PCT/CN2018/091274, filed on Jun. 14, 2018.

(30) Foreign Application Priority Data

Jun. 30, 2017 (CN) .......................... 201710532474.4

(51) Int. Cl.
*H04W 40/22* (2009.01)
*H04W 40/24* (2009.01)
*H04W 84/18* (2009.01)

(52) U.S. Cl.
CPC ......... *H04W 40/22* (2013.01); *H04W 40/246* (2013.01); *H04W 40/248* (2013.01); *H04W 84/18* (2013.01)

(58) Field of Classification Search
CPC . H04W 40/22; H04W 40/246; H04W 40/248; H04W 84/18; H04W 40/24
See application file for complete search history.

(56) References Cited

U.S. PATENT DOCUMENTS

2007/0288618 A1    12/2007  Yeo et al.
2009/0190521 A1*   7/2009   Horn .................... H04W 40/248
                                                    370/315
(Continued)

FOREIGN PATENT DOCUMENTS

CN    101150498 A    3/2008
CN    102111316 A    6/2011
(Continued)

OTHER PUBLICATIONS

Extended European Search Report issued in European Application No. 18825247.2 dated Apr. 1, 2020, 8 pages.
(Continued)

*Primary Examiner* — Hashim S Bhatti
(74) *Attorney, Agent, or Firm* — Fish & Richardson P.C.

(57) ABSTRACT

The present disclosure relates to data forwarding methods. One example method includes receiving, by a first node, a first data packet, where the first data packet includes first data and an identifier of a second node of the first data, querying, by the first node, a first route mapping relationship based on the identifier of the second node to determine a third node, where the first route mapping relationship includes a correspondence between the second node and the third node, and forwarding, by the first node, the first data to the third node.

15 Claims, 8 Drawing Sheets

(56) References Cited

U.S. PATENT DOCUMENTS

2013/0336321 A1* 12/2013 Kimura .................. H04L 45/02
                                                        370/392
2014/0071885 A1   3/2014 Cherian et al.
2017/0214672 A1*  7/2017 Alhalabi ............... H04L 9/3273

FOREIGN PATENT DOCUMENTS

| CN | 102223734 A | 10/2011 |
| CN | 102802227 A | 11/2012 |
| CN | 103108400 A | 5/2013  |
| CN | 103582161 A | 2/2014  |
| CN | 104967563 A | 10/2015 |
| CN | 105900380 A | 8/2016  |

OTHER PUBLICATIONS

Office Action issued in Chinese Application No. 201710532474.4 dated Mar. 11, 2020, 11 pages.

PCT International Search Report and Written Opinion issued in International Application No. PCT/CN2018/091274 dated Sep. 3, 2018, 17 pages(with English translation).

* cited by examiner

| ID of a DgNB | ID of an RN 1 | ID of an RN 4 | ID of an RN 9 |

| Prefix of a DgNB | prefix of an RN 1 | Prefix of an RN 4 | Prefix of an RN 9 |

DATA FORWARDING METHOD AND APPARATUS

CROSS-REFERENCE TO RELATED APPLICATIONS

This application is a continuation of International Application No. PCT/CN2018/091274, filed on Jun. 14, 2018, which claims priority to Chinese Patent Application No. 201710532474.4, filed on Jun. 30, 2017. The disclosures of the aforementioned applications are hereby incorporated by reference in their entireties.

TECHNICAL FIELD

This application relates to the communications field, and in particular, to a data forwarding method and an apparatus.

BACKGROUND

Compared with the fourth generation mobile communications technology (4G), the fifth generation mobile communications technology (5G) puts forward a more stringent requirement on a capacity indicator and a coverage requirement of a network. To meet a 5G ultra-high capacity requirement, it is a trend to use high-frequency small cells for networking in a hot spot area. However, it is very expensive and difficult in construction to provide optical fiber backhaul for densely deployed high-frequency small cells. In addition, to meet a 5G wide coverage requirement, network coverage needs to be provided in some remote areas. However, deployment of network coverage with optical fibers for remote areas is difficult and expensive. To resolve the foregoing two problems, both an access link and a backhaul link of a 5G-oriented wireless relay networking technology use a wireless transmission solution, to avoid optical fiber deployment.

The 5G-oriented wireless relay networking technology supports a multi-hop wireless relay networking scenario and a multi-hop and multi-connection wireless relay networking scenario. For example, as shown in FIG. 1a, in a multi-hop wireless relay networking scenario, a network topology on a radio access network side may be considered as a tree-based topology. In a tree-based topology, for an uplink data packet of user equipment (UE), each relay node (RN) may sequentially hand over the data packet to a unique parent node of the relay node based on a subordinate relationship, so that the data packet may be routed to a donor gNodeB (DgNB). However, a downlink data packet of the UE needs to be forwarded by the DgNB by using each relay node. How the relay node learns of a next-hop relay node corresponding to the downlink data packet is a problem that needs to be resolved. In a multi-hop and multi-connection wireless relay networking scenario, as shown in FIG. 1b, a network topology on a radio access network side may be considered as a mesh topology, and a relay node may have a plurality of relay nodes that provide a backhaul service for the relay node. For example, for a relay node 1, an uplink data packet and a downlink data packet of UE served by the relay node 1 may be forwarded by a relay node 3 or a relay node 4 on a transmission channel on an access network side. Therefore, how the relay node selects a correct routing manner for the data packet is a problem that needs to be resolved.

For the foregoing problem, in a layer 3 relay solution defined in the 3rd generation partnership project (3GPP) R10, as shown in FIG. 2, an evolved packet system (EPS) bearer may be established between UE served by a relay node and a packet data gateway (PGW). Corresponding to the EPS bearer, a tunnel based on a general packet radio service tunneling protocol (GTP) is established on an S1 interface between a donor eNodeB (Donor eNodeB, DeNB) and the PGW, and a corresponding GTP tunnel is also established on a Un interface between the relay node and the DeNB. Therefore, a correct next-hop node may be found between segments by using a bearer identifier or a tunnel identifier of a data packet. In addition, in a discussion of a solution of enhancing a device to device (D2D) relay between terminals in 3GPP R15, to enable a relay node to identify specific UE to which a downlink data packet belongs, the eNB may add an identifier of target remote UE to a to-be-forwarded data packet. However, whether the correct next-hop node is found between segments by using the bearer identifier or the tunnel identifier, or the identifier of the remote UE is added to a data packet header is usually performed in a single-hop relay scenario. Therefore, for a multi-hop wireless relay networking scenario or a multi-hop and multi-connection networking scenario, how to enable a relay node to forward a data packet to a correct next-hop node becomes a problem to be urgently resolved.

SUMMARY

Embodiments of this application provide a data forwarding method and an apparatus, to resolve a problem that a relay node cannot forward data to a correct next-hop node in a multi-hop wireless relay networking scenario or in a multi-hop and multi-connection networking scenario.

According to a first aspect, an embodiment of this application provides a data forwarding method, including: receiving, by a first node, a first data packet, where the first data packet includes first data and an identifier of a second node of the first data, and the identifier of the second node includes an identifier of a root node serving user equipment or an identifier of a node that is of the root node and that serves the user equipment; querying, by the first node, a first route mapping relationship based on the identifier of the second node, to determine a third node, where the first route mapping relationship includes a correspondence between the second node and the third node, and the third node is a next-hop node that is indicated in the first route mapping relationship and that the first data packet reaches after passing through the first node; and forwarding, by the first node, the first data to the third node. In this way, the first node may query the first route mapping relationship based on the identifier of the second node in the first data packet, to determine the third node (that is, a corresponding next-hop node that the first data packet reaches after passing through the first node); and then may forward the first data packet or the first data in the first data packet to the third node. Compared with the prior art in which a next-hop node is determined by using a bearer identifier, a tunnel identifier, or an identifier of remote UE and that is usually used in a single-hop relay scenario, in this embodiment of this application, a problem that a relay node cannot forward data to a correct next-hop node in a multi-hop wireless relay networking scenario or in a multi-hop and multi-connection networking scenario can be resolved.

In a possible design of the first aspect, the first data packet is an uplink data packet, and the first node is a node that is of the root node and that serves the user equipment, and before the querying, by the first node, a first route mapping relationship based on the identifier of the second node of the data packet, to determine a third node, the method further includes: adding, by the first node, the identifier of the second node of the first data to the first data packet. In this way, the first node may query the first route mapping relationship based on the identifier of the second node in the first data packet, to determine the third node; and may forward the first data packet or the first data in the first data packet to the third node, so that a problem that a relay node cannot forward data to a correct next-hop node in a multi-hop wireless relay networking scenario or a multi-hop and multi-connection networking scenario can be resolved.

In a possible design of the first aspect, the first data packet is a downlink data packet, the first node is the root node, and before the querying, by the first node, a first route mapping relationship based on the identifier of the second node, to determine a third node, the method further includes: adding, by the first node, the identifier of the second node of the first data to the first data packet. In this way, the first node may query the first route mapping relationship based on the identifier of the second node that is added to the first data packet, to determine the third node.

In a possible design of the first aspect, the first node is the root node, and the method further includes: generating, by the first node, a route mapping relationship based on a topology relationship of the first node and topology relationship information received by the first node, where the route mapping relationship includes the first route mapping relationship. In this way, each node of the root node may query, based on the identifier of the second node in the first data packet, the first route mapping relationship generated by the root node.

In a possible design of the first aspect, the method further includes: receiving, by the first node, the first route mapping relationship sent by a parent node of the first node, where the first route mapping relationship is generated by the root node, and the first node is connected to a core network by using the parent node of the first node. In this way, the first node may query, based on the identifier of the second node in the first data packet, the first route mapping relationship received from the parent node of the first node, to determine the third node.

According to a second aspect, an embodiment of this application provides a data forwarding method, including: receiving, by a first node, a first data packet, where the first data packet includes first data and transmission path information of the first data; determining, by the first node, a third node based on the transmission path information, where the third node is a next-hop node that is indicated in the transmission path information and that the first data packet reaches after passing through the first node; and forwarding, by the first node, the first data to the third node. In this way, the first node may determine the third node (that is, a corresponding next-hop node that the first data packet reaches after passing through the first node) based on the transmission path information in the first data packet, and then may forward the first data packet or the first data in the first data packet to the third node. Compared with the prior art in which a next-hop node is determined by using a bearer identifier, a tunnel identifier, or an identifier of remote UE and that is usually used in a single-hop relay scenario, in this embodiment of this application, a problem that a relay node cannot forward data to a correct next-hop node in a multi-hop wireless relay networking scenario or in a multi-hop and multi-connection networking scenario can be resolved.

In a possible design of the second aspect, the first data packet is an uplink data packet, the first node is a node that is of a root node and that serves user equipment, and before the determining, by the first node, a third node based on the transmission path information of the first data, the method further includes: adding, by the first node, the transmission path information of the first data to the first data packet. In this way, the first node may determine the third node based on the transmission path information in the first data packet.

In a possible design of the second aspect, the first data packet is a downlink data packet, the first node is a root node, and before the determining, by the first node, a third node based on the transmission path information of the first data, the method further includes: adding, by the first node, the transmission path information of the first data to the first data packet. In this way, the first node may determine the third node based on the transmission path information in the first data packet.

According to a third aspect, an embodiment of this application provides a data forwarding method, including: receiving, by a first node, a first data packet, where the first node is a node that is of a root node serving user equipment and that serves the user equipment, the first data packet is a downlink data packet, the first data packet includes first data and a first parameter of the first data, and the first parameter is used to indicate user equipment that receives the first data; and determining, by the first node based on the first parameter, the user equipment that receives the first data, and forwarding the first data to the user equipment. In this way, the first node may determine the user equipment based on the first parameter in the first data packet, and then may forward the first data packet or the first data in the first data packet to the user equipment. The first parameter may include at least one of an identifier of the UE (the identifier of the UE may be allocated to the UE by the node that is of the root node and that serves the UE), a bearer identifier, a quality of service (QoS) flow identifier, a protocol data unit (PDU) session identifier, and the like.

According to a fourth aspect, an embodiment of this application provides a data forwarding method, including: receiving, by a first node, a first data packet, where the first node is a node serving user equipment, the first data packet is an uplink data packet, the first data packet includes first data and a first parameter of the first data, and the first parameter is used to indicate user equipment that sends the first data and a transmission channel corresponding to the first data; and determining, by the first node based on the first parameter, the transmission channel corresponding to the first data, and forwarding the first data by using the transmission channel. In this way, the first node may determine the transmission channel based on the first parameter in the first data packet, and then may forward the first data by using the transmission channel. The first parameter may include at least one of a UE identifier, a bearer identifier, a QoS flow identifier, or a PDU session identifier.

In a possible design of the third aspect or the fourth aspect, the first data packet includes an identifier of a second node of the first data or transmission path information of the first data, and the method further includes: deleting, by the first node, the identifier of the second node of the first data or the transmission path information of the first data, to reduce signaling overheads.

In a possible design of the first aspect, the second aspect, the third aspect, or the fourth aspect, before the receiving, by a first node, a first data packet, the method further includes: generating, by the first node, a topology relationship of the first node, where the topology relationship of the first node includes an identifier of a first-type subnode and a status of a connection between the first node and the first-type subnode, and the first-type subnode is connected to a core network by using the first node. The first node may send, by using an intermediate node such as the parent node of the first node, the topology relationship of the first node to the root node serving the user equipment. The root node may generate a route forwarding relationship for each node based on a topology relationship of each node, so that the first node may query the route forwarding relationship based on the identifier of the second node in the first data packet, to determine the third node. Alternatively, the root node may generate the transmission path information for the data based on a topology relationship of each node, so that the first node may determine the third node based on the transmission path information of the first data.

In a possible design of the first aspect, the second aspect, the third aspect, or the fourth aspect, the method further includes: if the first node determines that any one of first-type subnodes of the first node is disconnected or connected, updating, by the first node, the topology relationship of the first node; or if the first node receives an update request sent by a parent node of the first node, updating, by the first node, the topology relationship of the first node, where the first node is connected to the core network by using the parent node of the first node. The first node may send, by using the intermediate node such as the parent node of the first node, the updated topology relationship to the root node serving the user equipment.

In a possible design of the first aspect, the second aspect, the third aspect, or the fourth aspect, the first-type subnode is directly or indirectly cascaded to a second-type subnode, the second-type subnode is directly or indirectly connected to the core network by using the first-type subnode, and the method further includes: receiving, by the first node, topology relationship information sent by the first-type subnode, where the topology relationship information includes a topology relationship of the first-type subnode, or the topology relationship information includes a topology relationship of the first-type subnode and a topology relationship of the second-type subnode. In addition, the first node may generate a new topology relationship of the first node based on the topology relationship of the first-type subnode and the topology relationship of the second-type subnode. The new topology relationship may include an identifier of the first-type subnode and an identifier of the second-type subnode and a corresponding connection relationship.

In a possible design of the first aspect, the second aspect, the third aspect, or the fourth aspect, the method further includes: sending, by the first node, the topology relationship of the first node and the topology relationship information to a parent node of the first node. The topology relationship information includes the topology relationship of the first-type subnode, or includes the topology relationship of the first-type subnode and the topology relationship of the second-type subnode.

According to a fifth aspect, an embodiment of this application provides a first node, including: a receiving unit, configured to receive a first data packet, where the first data packet includes first data and an identifier of a second node of the first data, and the identifier of the second node includes an identifier of a root node serving user equipment or an identifier of a node that is of the root node and that serves the user equipment; a processing unit, configured to query a first route mapping relationship based on the identifier of the second node, to determine a third node, where the first route mapping relationship includes a correspondence between the second node and the third node, and the third node is a next-hop node that is indicated in the first route mapping relationship and that the first data packet reaches after passing through the first node; and a sending unit, configured to forward the first data to the third node.

In a possible design of the fifth aspect, the processing unit is further configured to add the identifier of the second node of the first data to the first data packet.

According to a sixth aspect, an embodiment of this application provides a first node, including: a receiving unit, configured to receive a first data packet, where the first data packet includes first data and transmission path information of the first data; a processing unit, configured to determine a third node based on the transmission path information, where the third node is a next-hop node that is indicated in the transmission path information and that the first data packet reaches after passing through the first node; and a sending unit, configured to forward the first data to the third node.

In a possible design of the sixth aspect, the processing unit is further configured to add the transmission path information of the first data to the first data packet.

According to a seventh aspect, an embodiment of this application provides a first node, including: a receiving unit, configured to receive a first data packet, where the first node is a node that is of a root node serving user equipment and that serves the user equipment, the first data packet is a downlink data packet, the first data packet includes first data and a first parameter of the first data, and the first parameter is used to indicate user equipment that receives the first data; and a processing unit, configured to: determine, based on the first parameter, the user equipment that receives the first data, and forward the first data to the user equipment by a sending unit.

According to an eighth aspect, an embodiment of this application provides a first node, including: a receiving unit, configured to receive a first data packet, where the first node is a root node serving user equipment, the first data packet is an uplink data packet, the first data packet includes first data and a first parameter of the first data, and the first parameter is used to indicate user equipment that sends the first data and a transmission channel corresponding to the first data; and a processing unit, configured to determine, based on the first parameter, the transmission channel corresponding to the first data, where a sending unit forwards the first data by using the transmission channel.

In a possible design of the seventh aspect or the eighth aspect, the processing unit is further configured to delete an identifier of a second node of the first data or transmission path information of the first data.

In a possible design of the fifth aspect, the sixth aspect, the seventh aspect, or the eighth aspect, the processing unit is further configured to generate a topology relationship of the first node, where the topology relationship of the first node includes an identifier of a first-type subnode and a status of a connection between the first node and the first-type subnode, and the first-type subnode is connected to a core network by using the first node.

In a possible design of the fifth aspect, the sixth aspect, the seventh aspect, or the eighth aspect, the processing unit is further configured to: if it is determined that any one of first-type subnodes of the first node is disconnected or connected, update the topology relationship of the first node; or if an update request sent by a parent node of the first node is received by using the receiving unit, update the topology relationship of the first node, where the first node is connected to a core network by using the parent node of the first node.

In a possible design of the fifth aspect, the sixth aspect, the seventh aspect, or the eighth aspect, the receiving unit is further configured to receive topology relationship information sent by the first-type subnode, where the topology relationship information includes a topology relationship of the first-type subnode, or the topology relationship information includes a topology relationship of the first-type subnode and a topology relationship of a second-type subnode.

In a possible design of the fifth aspect, the sixth aspect, the seventh aspect, or the eighth aspect, the sending unit is further configured to send the topology relationship of the first node and the topology relationship information to a parent node of the first node.

In a possible design of the fifth aspect, the seventh aspect, or the eighth aspect, the processing unit is further configured to generate a route mapping relationship based on the topology relationship of the first node and the topology relationship information received by the first node, where the route mapping relationship includes the first route mapping relationship.

In a possible design of the fifth aspect, the seventh aspect, or the eighth aspect, the receiving unit is further configured to receive the first route mapping relationship sent by the parent node of the first node, where the first route mapping relationship is generated by the root node, and the first node is connected to the core network by using the parent node of the first node.

According to a ninth aspect, a chip is provided. The chip includes a processor, a memory, and a transceiver component. The transceiver component includes an input/output circuit, the memory is configured to store a computer executable instruction, and the processor implements any method provided in the first aspect, the second aspect, the third aspect, or the fifth aspect by executing the computer executable instruction stored in the memory.

According to a tenth aspect, a computer-readable storage medium is provided, including an instruction. When the instruction is run on a computer, the computer is enabled to perform any method provided in the first aspect, the second aspect, the third aspect, or the fourth aspect.

According to an eleventh aspect, a computer program product including an instruction is provided. When the computer program product is run on a computer, the computer is enabled to perform any method provided in the first aspect, the second aspect, the third aspect, or the fourth aspect.

In this way, the first node may query the first route mapping relationship based on the identifier of the second node in the first data packet, to determine the third node. Alternatively, the first node may determine the third node based on the transmission path information in the first data packet. Then the first node may forward the first data packet or the first data in the first data packet to the third node. Compared with the prior art in which a next-hop node is determined by using a bearer identifier, a tunnel identifier, or an identifier of remote UE and that is usually used in a single-hop relay scenario, in this embodiment of this application, a problem that a relay node cannot forward data to a correct next-hop node in a multi-hop wireless relay networking scenario or in a multi-hop and multi-connection networking scenario can be resolved.

DESCRIPTION OF EMBODIMENTS

Figure 1A:
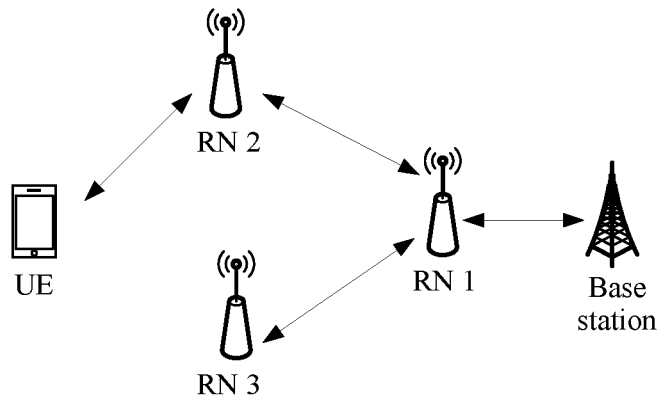
FIG. 1a is a schematic diagram of a multi-hop wireless relay networking scenario.
Figure 1B:
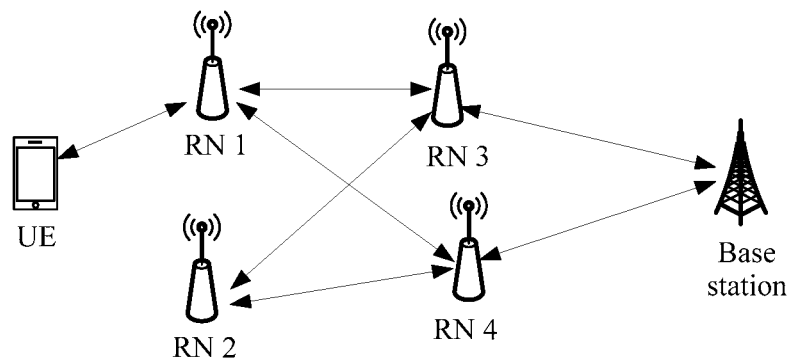
FIG. 1b is a schematic diagram of a multi-hop and multi-connection wireless relay networking scenario.
Figure 2:
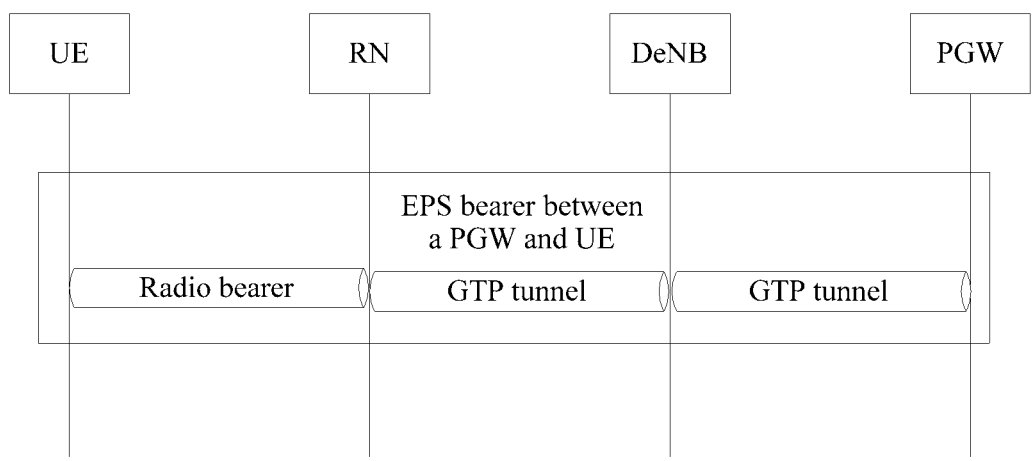
FIG. 2 is a schematic diagram of an existing method for performing communication between UE, an RN, a DeNB, and a PGW.
Figure 3:
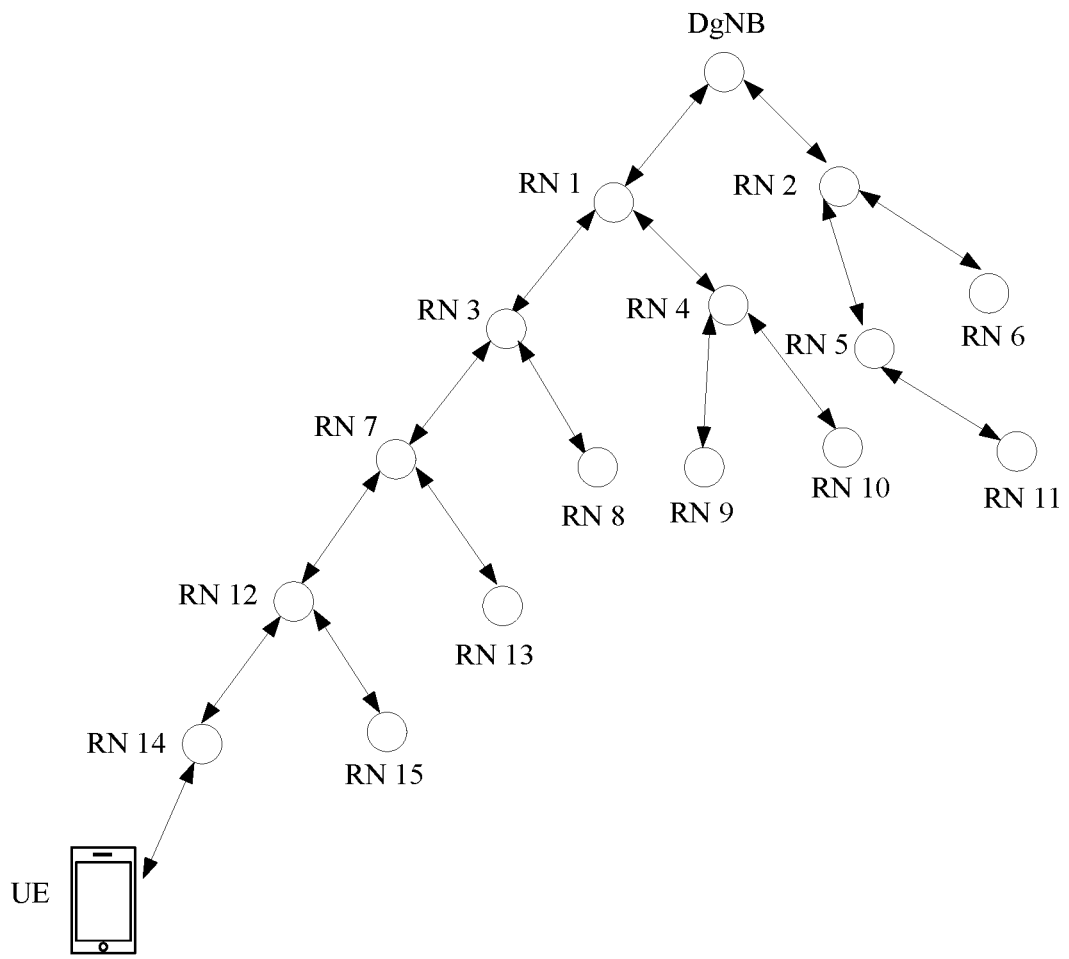
FIG. 3 is a schematic diagram of a multi-hop wireless relay architecture according to an embodiment of this application.

Embodiments of this application may be applied to a wireless relay networking scenario in 5G; for example, may be applied to a multi-hop RN relay scenario shown in FIG. 3. A DgNB is a root node that serves UE, and an RN directly connected to the UE is a node that is of the root node and that serves the UE. For example, an RN 14 directly connected to the UE is a node that is of the root node and that serves the UE.

As shown in FIG. 3, an architecture in an embodiment of this application may include UE and a plurality of levels of nodes. The plurality of levels of nodes may include a first node, a second node, and a third node. The first node, the second node, and the third node may be configured to forward first data or a first data packet. The first node may be understood as a current node that forwards the first data, the second node may be understood as a node directly connected to the UE or a root node that serves the UE, and the third node may be understood as a next-hop node corresponding to the current node. In this embodiment of this application, a node may be an RN, and the RN may be a device such as a switch, a router, a base station, an access point (AP), or a terminal that has a forwarding function.

The first node is configured to receive the first data packet, and the first data packet includes first data and an identifier (ID) of the second node of the first data. The first node queries a first route mapping relationship based on the ID of the second node to determine the third node. The first node forwards the first data or the first data packet to the third node. Alternatively, the first node receives the first data packet, and the first data packet includes the first data and transmission path information of the first data. The first node determines the third node based on the transmission path information. The first node forwards the first data or the first data packet to the third node.

For example, as shown in FIG. 3, if the first data packet is a downlink data packet, and the second node is an RN 14, that is, UE corresponding to the downlink data packet is connected to the RN 14, nodes through which the first data packet passes may be a DgNB, an RN 1, an RN 3, an RN 7, an RN 12, and an RN 14. When the first node is the RN 1, the third node is the RN 3, in other words, the RN 1 may send the downlink data packet to the RN 3. When the first node is the RN 3, the third node is the RN 7, in other words, the RN 3 may send the downlink data packet to the RN 7. When the first node is the RN 7, the third node is the RN 12, in other words, the RN 7 may send the downlink data packet to the RN 12. When the first node is the RN 12, the third node is the RN 14, in other words, the RN 12 may send the downlink data packet to the RN 14. The RN 14 may send the downlink data packet to the UE.

Figure 4:
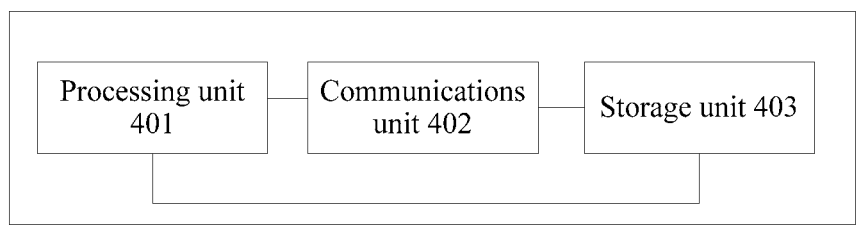
FIG. 4 is a schematic diagram of an internal structure of a first node according to an embodiment of this application.

FIG. 4 is a schematic diagram of an internal structure of a first node according to this application. In this application, the first node may include a processing unit 401, a communications unit 402, and a storage unit 403. The communications unit 402 may be configured to receive a first data packet. The processing unit 401 may be configured to query a first route mapping relationship based on an ID of a second node, to determine a third node; or determine a third node based on transmission path information in a data packet. The communications unit 402 may be further configured to forward a first data or a first data packet to the third node. The storage unit 403 may be configured to store the first route mapping relationship and the like in this embodiment of this application.

Figure 5:
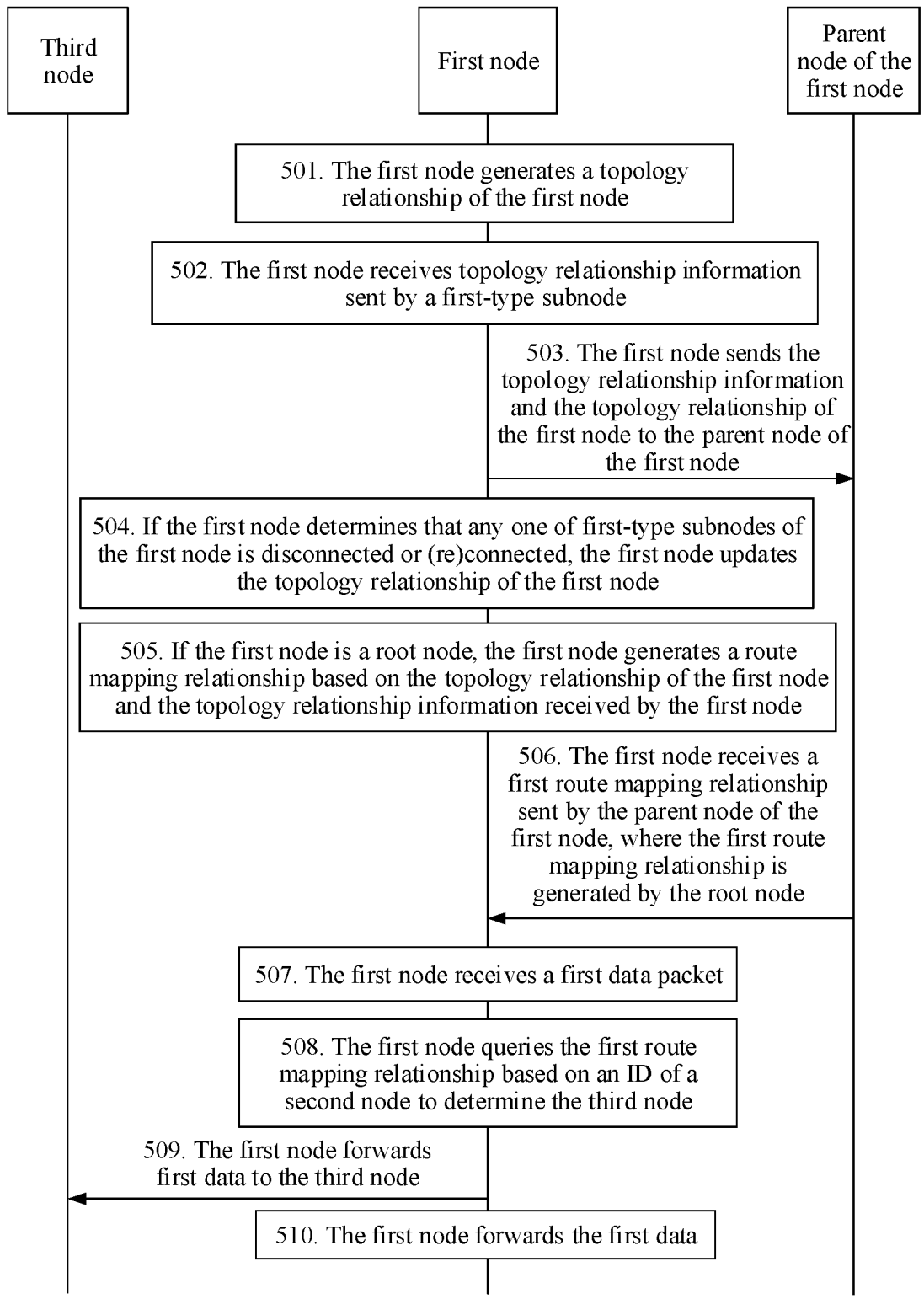
FIG. 5 is a schematic diagram of signal interaction between a first node, a parent node of the first node, and a third node according to an embodiment of this application.

An embodiment of this application provides a data forwarding method. As shown in FIG. 5, the method includes the following steps.

501. A first node generates a topology relationship of the first node.

When each node on a radio access network side completes initial access, the first node may generate the topology relationship of the first node based on a connection relationship between a first-type subnode and the first node. The first-type subnode may be connected to a core network by using the first node. In other words, the first-type subnode is a subnode directly connected to the first node. The topology relationship of the first node may include an ID of the first-type subnode and a status of a connection between the first node and the first-type subnode.

For example, the topology relationship of the first node may be a simplified topology table shown in Table 1. In a connection status list, "yes" indicates that the first-type subnode still remains connected to the first node, and "no" indicates that the first-type subnode has been disconnected from the first node. The disconnection may be caused by a handover, a radio link failure, or the like.

TABLE 1

| First-type subnode | Connection status |
| --- | --- |
| ID of an RN 1 | Yes |
| ID of an RN 2 | No |
| ... | ... |

In addition, if the first node is a node (that is, a leaf node) that has no subnode, the first node may generate no topology relationship or generate a topology relationship that is a null set.

502. The first node receives topology relationship information sent by the first-type subnode.

The first-type subnode is directly or indirectly cascaded to a second-type subnode, and the second-type subnode is directly or indirectly connected to the core network by using the first-type subnode. The topology relationship information includes a topology relationship of the first-type subnode, or the topology relationship information includes a topology relationship of the first-type subnode and a topology relationship of the second-type subnode.

For example, as shown in FIG. 3, assuming that the first node is an RN 7, correspondingly, first-type subnodes are an RN 12 and an RN 13, and second-type subnodes are an RN 14 and an RN 15. In this case, the RN 12 may send topology relationship information to the RN 7, and the topology relationship information includes a topology relationship of the RN 12. For another example, assuming that the first node is an RN 3, correspondingly, first-type subnodes are an RN 7 and an RN 8, and second-type subnodes are an RN 12, an RN 13, an RN 14, and an RN 15. In this case, the RN 7 may send topology relationship information to the RN 3, and the topology relationship information includes a topology relationship of the RN 7 and a topology relationship of the RN 12. It may be understood that the topology relationship of the RN 12 may be sent by the RN 12 to the RN 7.

503. The first node sends the topology relationship information and the topology relationship of the first node to a parent node of the first node.

The first node is connected to the core network by using the parent node of the first node.

For example, as shown in FIG. 3, when the first node is an RN 7 and the parent node of the first node is an RN 3, the RN 7 may send a topology relationship of the RN 7 and a topology relationship of an RN 12 to an RN 3. It may be understood that the topology relationship of the RN 12 may be sent by the RN 12 to the RN 7. In this way, if the first node is a DgNB, the topology relationship information received by the DgNB may include topology relationships of all nodes that have subnodes and that are of the DgNB.

504. If the first node determines that any one of first-type subnodes of the first node is disconnected or connected, the first node updates the topology relationship of the first node.

After the first-type subnode of the first node is disconnected due to mobility, sleep, or the like, when the first node maintains the topology relationship of the first node, the first node updates the topology relationship of the first node. In addition, the first node may send an updated topology relationship to the parent node of the first node.

Figure 6A:
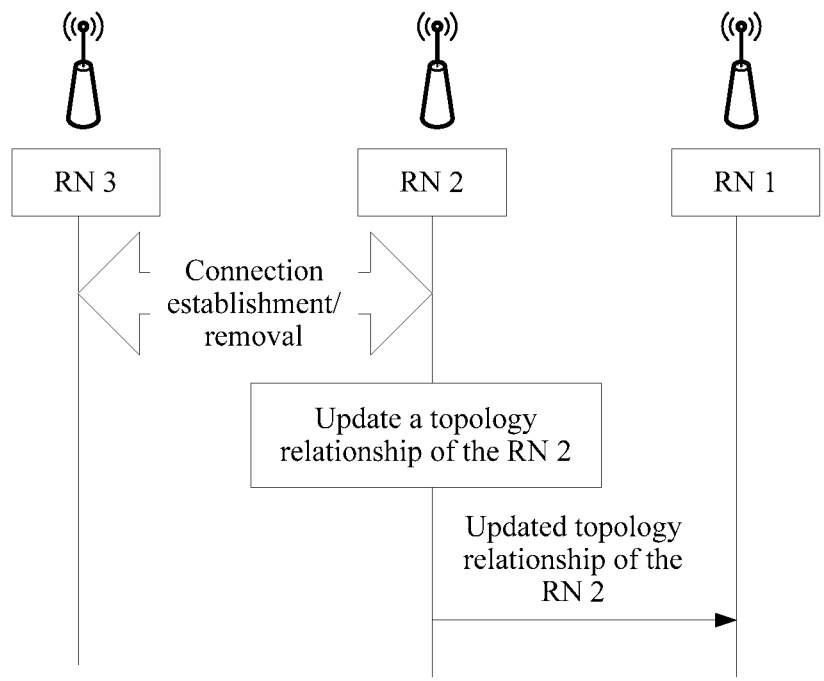
FIG. 6a is a schematic diagram of a topology update process of a first node based on a connection establishment/removal process according to an embodiment of this application.

For example, as shown in FIG. 6a, assuming that an RN 1 is the parent node of the first node, an RN 2 is the first node, and an RN 3 is the first-type subnode of the first node, when the RN 3 is disconnected or (re)establishes a connection to the RN 2, the RN 2 updates a topology relationship of the RN 2, and sends an updated topology relationship of the RN 2 to the RN 1.

In a possible design, the first node may update the topology relationship of the first node after receiving a topology update request sent by the parent node of the first node.

Figure 6B:
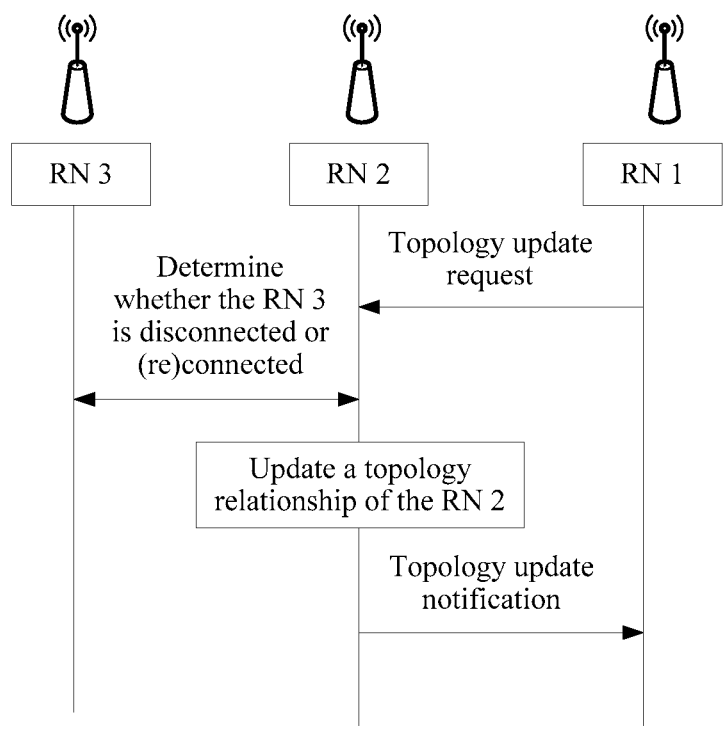
FIG. 6b is a schematic diagram of a topology update process of a first node based on a topology update request according to an embodiment of this application.

For example, as shown in FIG. 6b, assuming that an RN 1 is the parent node of the first node, an RN 2 is the first node, and an RN 3 is the first-type subnode of the first node, the RN 1 may send a topology update request to the RN 2 periodically (or the RN 1 may be triggered by an event to send a topology update request to the RN 2). After receiving the topology update request, the RN 2 determines whether the RN 3 is disconnected or (re)connected, to update a topology relationship of the RN 2. The RN 2 may further send a topology update notification to the RN 1, and the topology update notification includes an updated topology relationship.

It should be noted that in a process in which the first node sends the updated topology relationship to the parent node of the first node, the first node may send the updated topology relationship to the parent node of the first node, or may indicate only updated content to the parent node of the first node. For example, the first node may notify an ID of a newly added/deleted node and a corresponding connection relationship to the parent node of the first node, to reduce signaling overheads.

In another possible design, the first node sends a topology update request to the first-type subnode. The topology update request may be periodically sent, or sending the topology update request may be triggered by an event. For example, a possible trigger event is: The first node receives the topology update request sent by the parent node of the first node.

505. If the first node is a root node, the first node generates a route mapping relationship based on the topology relationship of the first node and the topology relationship information received by the first node.

In other words, the root node generates a route mapping relationship of each node of the root node based on the topology relationship of the root node and the topology relationship information received by the root node.

As shown in FIG. 3, if the first node is a DgNB, the DgNB may generate a route forwarding relationship for each of the RN 1, the RN 2, the RN 3, the RN 4, the RN 5, the RN 7, and the RN 12 based on a topology relationship of the DgNB and topology relationships received by the DgNB that are of the RN 3, the RN 4, the RN 5, the RN 7, and the RN 12.

For example, a route forwarding relationship maintained by the RN 1 may be a route forwarding table shown in Table 2. The route forwarding table may include a mapping relationship between an ID of a second node and an ID of a third node. For a downlink data packet, the ID of the second node is an ID of an RN that is of the root node and that serves UE, and for an uplink data packet, the ID of the second node is an ID of the root node. Optionally, the route forwarding table may further include an ID of a fourth node. For the downlink data packet, the ID of the fourth node is the ID of the root node, and for the uplink data packet, the ID of the fourth node is an ID of an RN that is of the root node and that serves the UE.

TABLE 2

| ID of the fourth node | ID of the second node | ID of the third node |
|---|---|---|
| ID of a DgNB | ID of an RN 3, ID of an RN 7, ID of an RN 8, ID of an RN 12, ID of an RN 13, ID of an RN 14, and ID of an RN 15 | ID of the RN 3 |
| ID of the DgNB | ID of an RN 4, ID of an RN 9, and ID of an RN 10 | ID of the RN 4 |

TABLE 2-continued

| ID of the fourth node | ID of the second node | ID of the third node |
|---|---|---|
| ID of the RN 3, ID of the RN 4, ID of the RN 7, ID of the RN 8, ID of the RN 9, ID of the RN 10, ID of the RN 12, ID of the RN 13, ID of the RN 14, ID of the RN 15 | ID of the DgNB | ID of the DgNB |

For another example, an RN 3 may maintain a route forwarding table shown in Table 3.

TABLE 3

| ID of the fourth node | ID of the second node | ID of the third node |
|---|---|---|
| ID of a DgNB | ID of an RN 7, ID of an RN 12, ID of an RN 13, ID of an RN 14, and ID of an RN 15 | ID of the RN 7 |
| ID of the DgNB | ID of an RN 8 | ID of the RN 8 |
| ID of the RN 7, and ID of the RN 8 | ID of the DgNB | ID of an RN 1 |

506. The first node receives a first route mapping relationship sent by the parent node of the first node, where the first route mapping relationship is generated by the root node.

For example, as shown in FIG. 3, if the first node is an RN 3, and the parent node of the first node is an RN 1, the RN 3 receives a route mapping relationship of the RN 3 from the RN 1, and the route mapping relationship of the RN 3 is generated by the DgNB and sent to the RN 1.

507. The first node receives a first data packet.

The first data packet includes first data, and the first data may include signaling and/or service data.

It should be noted that if the first node is the root node and the first data packet is a downlink data packet, the first node adds the ID of the second node of the first data to the first data packet after receiving the first data packet. Herein, the ID of the second node is an ID of a node that is of the root node and that serves the UE. The ID of the node that serves the UE may be obtained by the root node based on the topology relationship of the root node and the topology relationship information received by the root node.

It may be understood that when a next-hop node of the root node receives the first data packet, the first data packet includes the first data and the ID of the second node.

Similarly, if the first node is a node that is of the root node and that serves the UE, and the first data packet is an uplink data packet, the first node may add the ID of the second node of the first data to the first data packet after receiving the first data packet. Herein, the ID of the second node may be the ID of the root node.

It may be understood that when a next-hop node of the node that is of the root node and that serves the UE receives the first data packet, the first data packet includes the first data and the ID of the second node.

In addition, the root node may further configure a processing priority and a mapping rule of a quality of service QoS flow of the first data, so that the root node may process the first data packet based on the processing priority and the mapping rule of the QoS flow when the next-hop node of the root node or the next-hop node of the node that serves the UE receives the first data packet.

In a possible design, the first data packet may further include an ID of a fourth node of the first data.

In a possible design, the first data packet may further include a first parameter of the first data. If the first data is uplink data, the first parameter may include at least one of an identifier of the UE, a bearer identifier, a QoS flow identifier, a PDU session identifier, and the like, and is used to indicate UE that sends the first data and a transmission channel corresponding to the first data. If the first data is downlink data, the first parameter may include at least one of an identifier of the UE (the identifier of the UE may be allocated to the UE by the node that is of the root node and that serves the UE), a bearer identifier, a QoS flow identifier, a PDU session identifier, and the like, and is used to indicate UE that receives the first data and/or a QoS requirement corresponding to the first data.

If the identifier of the UE is allocated to the UE by the node that serves the UE, when the UE is connected to the node that serves the UE, the node that serves the UE may allocate a local UE ID to the UE, and the local UE ID is unique for all UEs and RNs served by the node that serves the UE (it may be understood that the node that serves the UE may serve a plurality of UEs or RNs). Then the node that serves the UE may notify the root node of local UE ID information by using an intermediate node such as a parent node of the node. The root node may record the local UE ID, and record a connection relationship between the node serving the UE and the UE.

508. The first node queries the first route mapping relationship based on the ID of the second node to determine the third node.

The first route mapping relationship includes a correspondence between the second node and the third node, and the third node is a next-hop node that is indicated in the first route mapping relationship and that the first data packet reaches after passing through the first node.

For example, it is assumed that the first node is an RN 1, and the second node is an RN 7. Referring to Table 2 in step 505, it may be learned that the third node is an RN 3, in other words, the RN 3 is a next-hop node that the first data packet reaches after passing through the RN 1.

509. The first node forwards the first data to the third node.

In other words, the first node forwards the first data to the next-hop node that is indicated in the first route mapping relationship and that the first data packet reaches after passing through the first node.

It may be understood that, after the third node receives the first data, the third node may be considered as the first node, that is, a current node. When the first data packet is an uplink data packet and the first node is a root node that serves the UE, or when the first data packet is a downlink data packet and the first node is a node that is of the root node and that serves the UE, the first node may perform step 510.

510. The first node forwards the first data.

After receiving the first data packet, the first node may delete the ID of the second node and/or the ID of the fourth node in the first data packet, to reduce signaling overheads.

If the first data packet is an uplink data packet and the first node is the root node that serves the UE, the first node determines, based on the first parameter, the UE that sends the first data and the transmission channel (for example, an N3 tunnel corresponding to the UE) corresponding to the first data, and forwards the first data to a core network node (for example, a user plane function (UPF)) by using the transmission channel.

If the first data packet is a downlink data packet, and the first node is the node that is of the root node and that serves the UE, the first node determines, based on the first parameter, the UE that receives the first data, and forwards the first data to the UE.

It should be noted that there is no inevitable execution sequence for step 501 to step 510. An execution sequence of the steps is not specifically limited in this embodiment.

In this way, when receiving the first data packet, the first node may query the first route mapping relationship based on the identifier of the second node in the first data packet, to determine the third node (that is, a corresponding next-hop node that the first data packet reaches after passing through the first node), and then may forward the first data packet or the first data in the first data packet to the third node. This embodiment of this application may be applied to a multi-hop wireless relay networking scenario or a multi-hop and multi-connection networking scenario. Compared with the prior art in which a next-hop node is determined by using a bearer identifier, a tunnel identifier, or an identifier of remote UE and that is usually used in a single-hop relay scenario, in this embodiment of this application, a problem that a relay node cannot forward data to a correct next-hop node in a multi-hop wireless relay networking scenario or in a multi-hop and multi-connection networking scenario can be resolved.

In a possible design, the first data packet may further include a first parameter, used to indicate a transmission channel corresponding to the first data and/or user equipment corresponding to the first data. The first node may further forward, based on the first parameter, the first data or the first data packet to the user equipment that correspondingly receives the first data, or forward the first data or the first data packet to a core network device by using the transmission channel corresponding to the user equipment that sends the first data.

Figure 7:
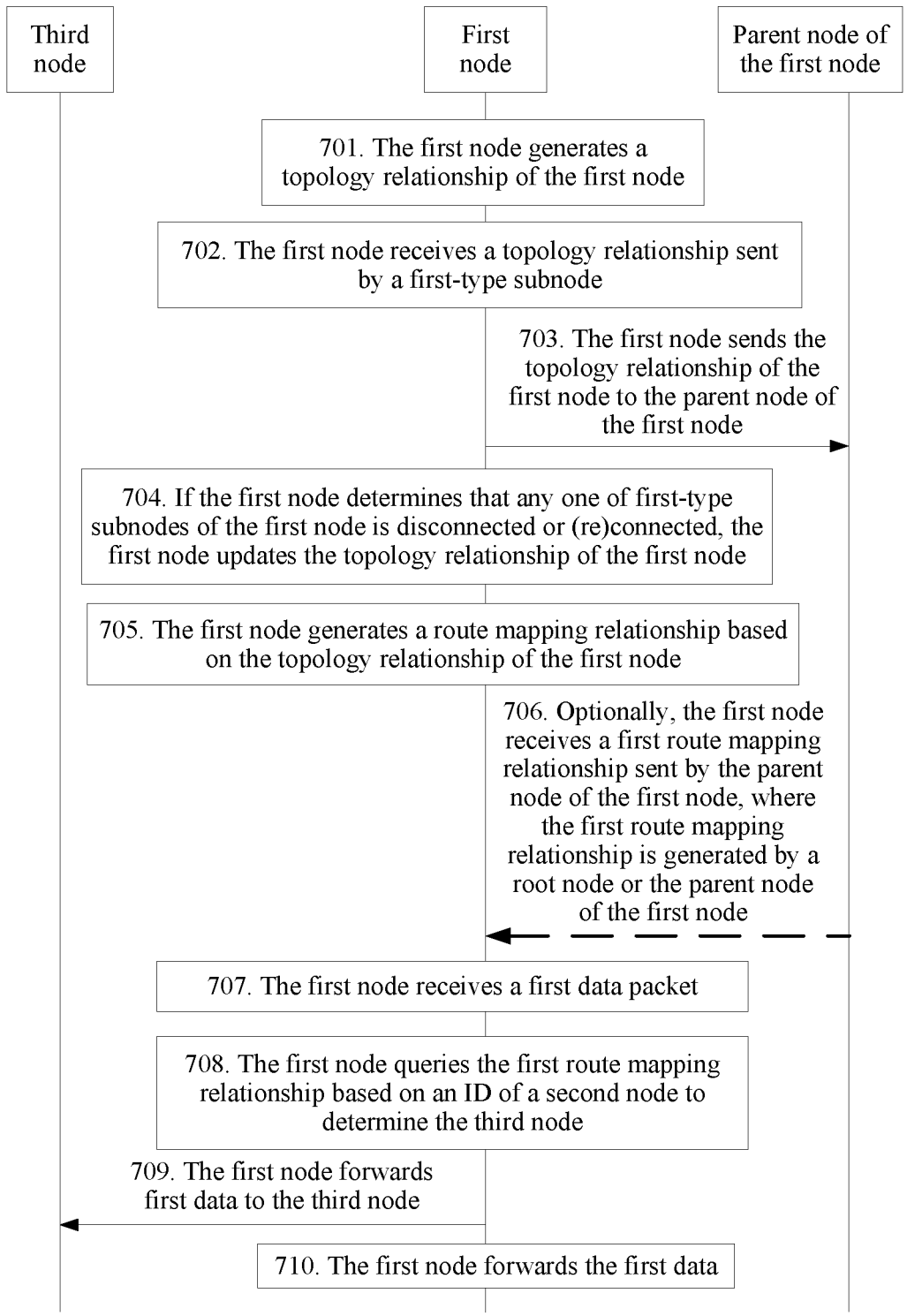
FIG. 7 is a schematic diagram of signal interaction between a first node, a parent node of the first node, and a third node according to an embodiment of this application.

Another embodiment of this application provides a data forwarding method. As shown in FIG. 7, the method includes the following steps.

701. A first node generates a topology relationship of the first node.

Unlike step 501, the first node may generate the topology relationship of the first node based on a connection relationship between a first-type subnode and the first node and a connection relationship between the first-type subnode and a second-type subnode. That is, the topology relationship of the first node not only may include an ID of the first-type subnode and a status of a connection between the first node and the first-type subnode, but also may include an ID of the second-type subnode and the connection relationship between the first-type subnode and the second-type subnode.

The first-type subnode may be a level 1 subnode, and the second-type subnode may include a level 2 subnode, a level 3 subnode, . . . , or even a level N subnode. The level 1 subnode is directly connected to the first node, that is, the level 1 subnode is connected to a core network by using the first node. The level 2 subnode is directly connected to the level 1 subnode, that is, the level 2 subnode is connected to the core network by using the level 1 subnode, . . . , and the level N subnode is directly connected to the level N−1 subnode, that is, the level N subnode is connected to the core network by using the level N−1 subnode.

As shown in FIG. 3, if the first node is an RN 1, the topology relationship of the first node may include IDs of level 1 subnodes RN 3 and RN 4, IDs of level 2 subnodes RN 7, RN 8, RN 9, and RN 10, IDs of level 3 subnodes RN 12 and RN 13, IDs of level 4 subnodes RN 14 and RN 15, and a corresponding status of a connection between the first node and each level of subnode. For example, the topology relationship of the RN 1 may be shown in a topology relationship list shown in Table 4.

TABLE 4

| Level 1 subnode | Connection status | Level 2 subnode | Connection status | Level 3 subnode | Connection status | Level 4 subnode | Connection status |
|---|---|---|---|---|---|---|---|
| ID of the RN 3 | Yes | ID of the RN 7 | Yes | ID of the RN 12 | Yes | ID of the RN 14 | Yes |
|  |  |  |  |  |  | ID of the RN 15 | Yes |
|  |  |  |  | ID of the RN 13 | Yes | / | / |
|  |  | ID of the RN 8 | Yes | / | / | / | / |
| ID of the RN 4 | Yes | ID of the RN 9 | Yes | / | / | / | / |
|  |  | ID of the RN 10 | Yes | / | / | / | / |

For another example, as shown in FIG. 3, if the first node is an RN 3, a topology relationship of the RN 3 may include IDs of level 1 subnodes RN 7 and RN 8, IDs of level 2 subnodes RN 12 and RN 13, IDs of level 3 subnodes RN 14 and RN 15, and a corresponding connection relationship between the first node and each level of subnode. For example, the topology relationship of the RN 3 may be shown in a topology relationship list shown in Table 5.

TABLE 5

| Level 1 subnode | Connection status | Level 2 subnode | Connection status | Level 3 subnode | Connection status |
|---|---|---|---|---|---|
| ID of the RN 7 | Yes | ID of the RN 12 | Yes | ID of the RN 14 | Yes |
|  |  |  |  | ID of the RN 15 | Yes |
|  |  | ID of the RN 13 | Yes | / | / |
| ID of the RN 8 | Yes | / | / | / | / |

702. The first node receives a topology relationship sent by the first-type subnode.

For example, as shown in FIG. 3, when the first node is an RN 3, and first-type subnodes are an RN 7 and an RN 8, the first node may receive a topology relationship of the RN 7 sent by the RN 7.

In a possible design, the first node may update the topology relationship of the first node based on the topology relationship sent by the first-type subnode.

703. The first node sends the topology relationship of the first node to a parent node of the first node.

For example, as shown in FIG. 3, when the first node is an RN 1 and the parent node of the first node is a DgNB, the RN 1 may send the topology relationship shown in Table 4 to the DgNB.

704. If the first node determines that any one of first-type subnodes of the first node is disconnected or (re)connected, the first node updates the topology relationship of the first node.

For a specific process, refer to step 504.

705. The first node generates a route mapping relationship based on the topology relationship of the first node.

For a specific process, refer to step 505.

706. Optionally, the first node receives a first route mapping relationship sent by the parent node of the first node, where the first route mapping relationship is generated by a root node or the parent node of the first node.

707. The first node receives a first data packet.

For a specific process, refer to step 507.

708. The first node queries the first route mapping relationship based on an ID of a second node to determine a third node.

For a specific process, refer to step 508.

709. The first node forwards first data to the third node.

For a specific process, refer to step 509.

It may be understood that, after receiving the first data, the third node may be considered as the first node, that is, a current node. When the first data packet is an uplink data packet and the first node is a root node that serves UE, or when the first data packet is a downlink data packet and the first node is a node that is of the root node and that serves UE, the first node may perform step 710.

710. The first node forwards the first data.

For a specific process, refer to step 510.

It should be noted that there is no inevitable execution sequence for step 701 to step 710. An execution sequence of the steps is not specifically limited in this embodiment.

In this way, the first node may query the first route mapping relationship based on an identifier of the second node in the first data packet, to determine the third node (that is, a corresponding next-hop node that the first data packet reaches after passing through the first node), and then may forward the first data packet or the first data in the first data packet to the third node. Compared with the prior art in which a next-hop node is determined by using a bearer identifier, a tunnel identifier, or an identifier of remote UE and that is usually used in a single-hop relay scenario, in this embodiment of this application, a problem that a relay node cannot forward data to a correct next-hop node in a multi-hop wireless relay networking scenario or in a multi-hop and multi-connection networking scenario can be resolved.

In a possible design, the first data packet may further include a first parameter, used to indicate a transmission channel corresponding to the first data and/or user equipment corresponding to the first data. The first node may further forward, based on the first parameter, the first data or the first data packet to the user equipment that correspondingly receives the first data, or forward the first data or the first data packet to a core network device by using the transmission channel corresponding to the user equipment that sends the first data.

Figure 8:
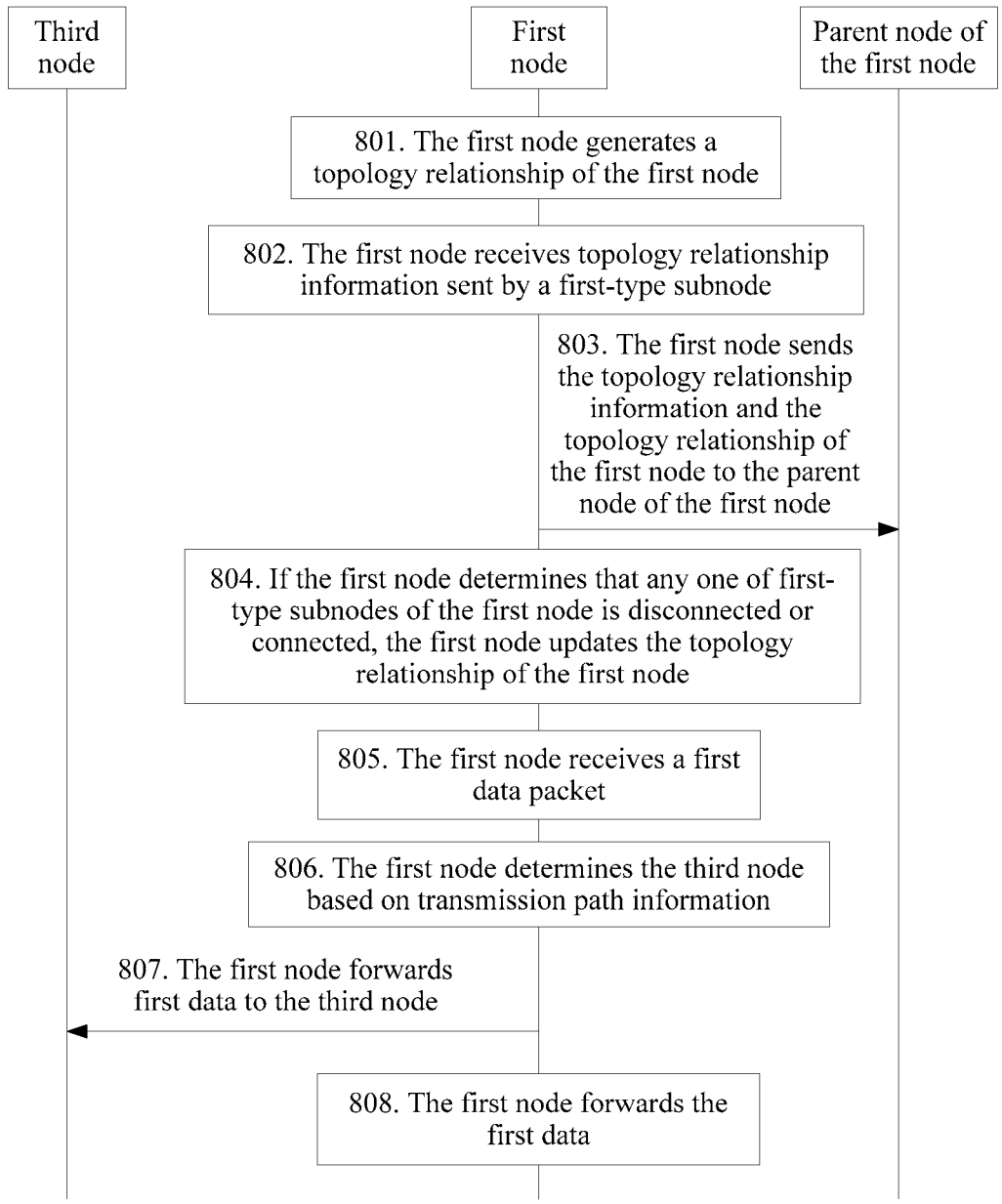
FIG. 8 is a schematic diagram of signal interaction between a first node, a parent node of the first node, and a third node according to an embodiment of this application.

Still another embodiment of this application provides a data forwarding method. As shown in FIG. 8, the method includes the following steps.

801. A first node generates a topology relationship of the first node.

For a specific process, refer to step 501.

802. The first node receives topology relationship information sent by a first-type subnode.

For a specific process, refer to step 502.

803. The first node sends the topology relationship information and the topology relationship of the first node to a parent node of the first node.

For a specific process, refer to step 503.

804. If the first node determines that any one of first-type subnodes of the first node is disconnected or connected, the first node updates the topology relationship of the first node.

For a specific process, refer to step 504.

Steps 801 to 804 in this embodiment of this application are similar to steps 501 to 504 in the embodiment shown in FIG. 5. Details are not described in this embodiment of this application again. This embodiment of this application mainly differs from the embodiment shown in FIG. 5 in a different processing process during data packet forwarding. The following describes a data forwarding processing process in detail in this embodiment of this application.

805. The first node receives a first data packet.

The first data packet includes first data, and the first data may include signaling and/or service data.

If the first node is a root node and the first data packet is a downlink data packet, the first node adds transmission path information of the first data to the first data packet after receiving the first data packet. The transmission path information may include IDs of nodes through which the first data passes in sequence. The transmission path information may be generated by the root node for the first data based on a topology relationship of the root node and topology relationship information received by the root node.

It may be understood that when a next-hop node of the root node is the first node, the first data packet received by the first node includes the first data and the transmission path information of the first data.

Similarly, if the first node is a node that is of the root node and that serves UE, and the first data packet is an uplink data packet, the first node may add the transmission path information of the first data to the first data packet after receiving the first data packet. The transmission path information may be sent by the root node to the first node by using an intermediate node. It may be understood that when a next-hop node of the node that is of the root node and that serves the UE receives the first data packet, the first data packet includes the transmission path information of the first data.

Figures 9A, 9B, 10:
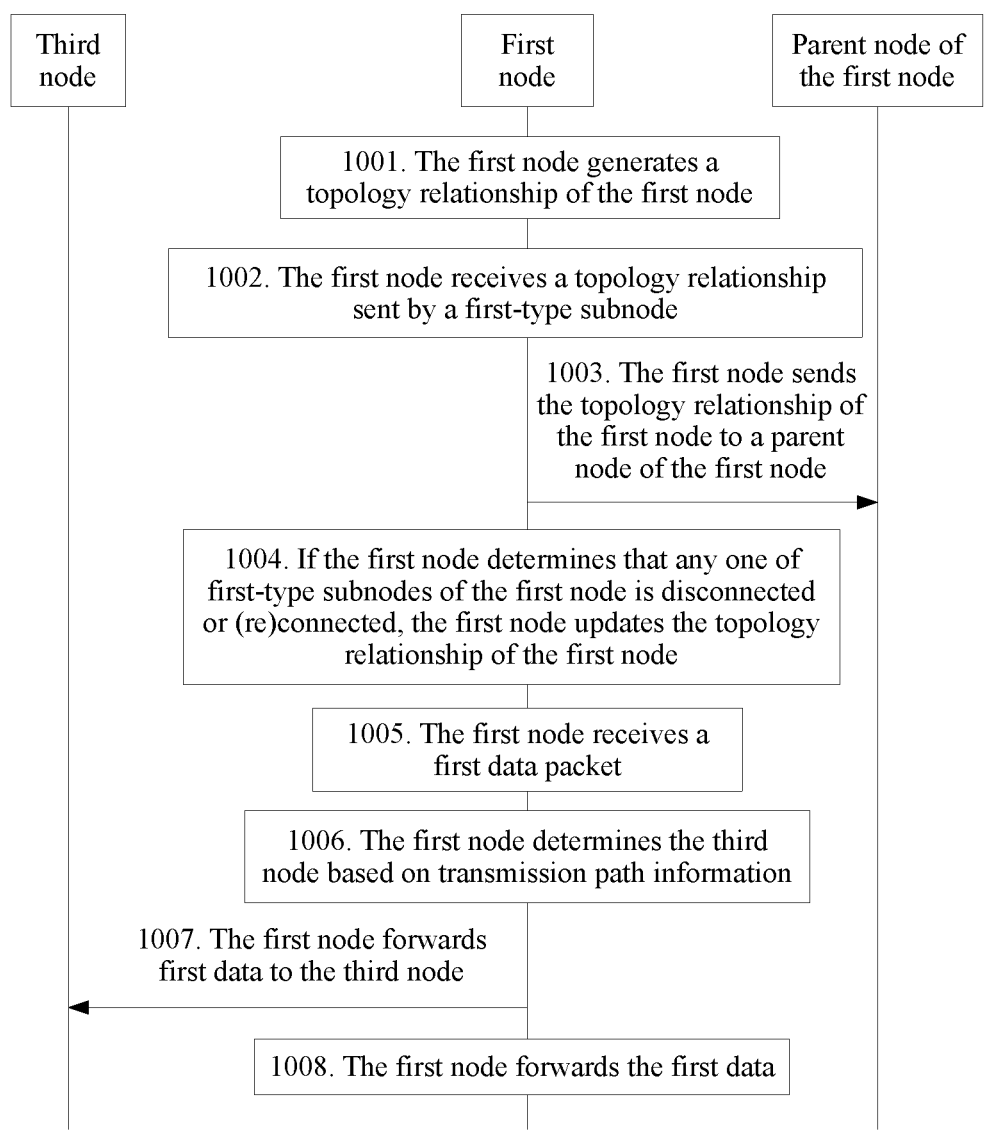
FIG. 9a is a schematic diagram of a format of transmission path information according to an embodiment of this application.
FIG. 9b is a schematic diagram of a format of transmission path information according to an embodiment of this application.
FIG. 10 is a schematic diagram of signal interaction between a first node, a parent node of the first node, and a third node according to an embodiment of this application.

For example, assuming that nodes through which the first data packet passes in sequence are a DgNB, an RN 1, an RN 4, and an RN 9, a format of the transmission path information may be shown in FIG. 9*a*. Optionally, the transmission path information may not include an ID of the DgNB.

In a possible design, when each node establishes a connection to a parent node of the node, the parent node may allocate a specific prefix to the node, and may notify, in topology update notification information, an allocated prefix value up until the root node level by level. The root node may indicate transmission path information based on a specific prefix of each node. For example, the format of the transmission path information may also be shown in FIG. 9*b*.

In a possible design, the first data packet may further include a first parameter of the first data. If the first data is uplink data, the first parameter may include at least one of an identifier of the UE, a bearer identifier, a QoS flow identifier, a PDU session identifier, and the like, and is used to indicate UE that sends the first data and a transmission channel corresponding to the first data. If the first data is downlink data, the first parameter may include at least one of an identifier of the UE (the identifier of the UE may be allocated to the UE by a node that is of the root node and that serves the UE), a bearer identifier, a QoS flow identifier, a PDU session identifier, and the like, and is used to indicate UE that receives the first data and/or a QoS requirement corresponding to the first data.

806. The first node determines a third node based on the transmission path information.

The third node is a next-hop node that is indicated in the transmission path information and that the first data packet reaches after passing through the first node. The first node may send the data packet to the correct next-hop node based on an indication in the transmission path information.

For example, referring to FIG. 9*a*, assuming that the first node is an RN 1, it may be learned that the third node is an RN 4, that is, the RN 4 is a next-hop node that the first data packet reaches after passing through the RN 1.

807. The first node forwards the first data to the third node.

In other words, the first node forwards the first data to the next-hop node that is indicated in the transmission path information and that the first data packet reaches after passing through the first node.

Before forwarding the first data, the first node may also forward the transmission path information included in the first data packet to the next-hop node. Alternatively, before forwarding the first data, the first node may strip an ID or a prefix of the first node in the transmission path information, to reduce overheads caused by an ID or prefix transmitted on a subsequent link.

It may be understood that, after receiving the first data, the third node may be considered as the first node, that is, a current node. When the first data packet is an uplink data packet and the first node is a root node that serves the UE, or when the first data packet is a downlink data packet and the first node is a node that is of the root node and that serves the UE, the first node may perform step 808.

808. The first node forwards the first data.

If the first data packet is an uplink data packet and the first node is a root node that serves the UE, the first node determines, based on the first parameter, UE that sends the first data and a transmission channel (for example, an N3 tunnel corresponding to the UE) corresponding to the first data, and forwards the first data to a core network node such as a UPF by using the transmission channel. Before forwarding the first data, the first node may strip all transmission path identifiers or prefix information included in the first data packet, to reduce unnecessary link overheads.

If the first data packet is a downlink data packet, and the first node is a node that is of the root node and that serves the UE, the first node determines, based on the first parameter, UE that receives the first data, and forwards the first data to the UE.

It should be noted that there is no inevitable execution sequence for step 801 to step 808. An execution sequence of the steps is not specifically limited in this embodiment.

In this way, the first node may determine the third node (that is, a corresponding next-hop node that the first data packet reaches after passing through the first node) based on the transmission path information in the first data packet, and then may forward the first data packet or the first data in the first data packet to the third node. Compared with the prior art in which a next-hop node is determined by using a bearer identifier, a tunnel identifier, or an identifier of remote UE and that is usually used in a single-hop relay scenario, in this embodiment of this application, a problem that a relay node cannot forward data to a correct next-hop node in a multi-hop wireless relay networking scenario or in a multi-hop and multi-connection networking scenario can be resolved.

In a possible design, the first data packet may further include a first parameter, used to indicate a transmission channel corresponding to the first data and/or user equipment corresponding to the first data. The first node may further forward, based on the first parameter, the first data or the first data packet to the user equipment that correspondingly receives the first data, or forward the first data or the first data packet to a core network device by using the transmission channel corresponding to the user equipment that sends the first data.

Yet another embodiment of this application provides a data forwarding method. As shown in FIG. 10, the method includes the following steps.

1001. A first node generates a topology relationship of the first node.

For a specific process, refer to step 701.

1002. The first node receives a topology relationship sent by a first-type subnode.

For a specific process, refer to step 702.

1003. The first node sends the topology relationship of the first node to a parent node of the first node.

For a specific process, refer to step 703.

1004. If the first node determines that any one of first-type subnodes of the first node is disconnected or (re)connected, the first node updates the topology relationship of the first node.

For a specific process, refer to step 704.

1005. The first node receives a first data packet.

If the first node is a root node and the first data packet is a downlink data packet, or if the first node is a node that is of the root node and that serves UE and the first data packet is an uplink data packet, the first node may add transmission path information of first data to the first data packet. The transmission path information may include IDs of nodes through which the first data passes in sequence. Unlike step 805, the transmission path information may be generated by the root node for the first data based on a topology relationship of the root node.

1006. The first node determines a third node based on the transmission path information.

For a specific process, refer to step 806.

1007. The first node forwards the first data to the third node.

For a specific process, refer to step 807.

It may be understood that, after receiving the first data, the third node may be considered as the first node, that is, a current node. When the first data packet is an uplink data packet and the first node is a root node that serves the UE, or when the first data packet is a downlink data packet and the first node is a node that is of the root node and that serves the UE, the first node may perform step 1008.

1008. The first node forwards the first data.

For a specific process, refer to step 808.

It should be noted that there is no inevitable execution sequence for step 1001 to step 1008. An execution sequence of the steps is not specifically limited in this embodiment.

In this way, the first node may determine the third node based on the transmission path information in the first data packet, and then may forward the first data packet or the first data in the first data packet to the third node. Compared with the prior art in which a next-hop node is determined by using a bearer identifier, a tunnel identifier, or an identifier of remote UE and that is usually used in a single-hop relay scenario, in this embodiment of this application, a problem that a relay node cannot forward data to a correct next-hop node in a multi-hop wireless relay networking scenario or in a multi-hop and multi-connection networking scenario can be resolved.

The foregoing mainly describes the solutions provided in the embodiments of this application from the perspective of the first node. It may be understood that, to implement the foregoing functions, the first node includes a corresponding hardware structure and/or software module for performing each of the functions. A person skilled in the art should easily be aware that, in combination with the algorithm steps described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed on the first node according to the foregoing method examples. For example, each function module corresponding to each function may be obtained through division, or two or more functions may be integrated into one processing module. The integrated module may be implemented in a form of hardware, or may be implemented in a form of a software functional module. It should be noted that, in the embodiments of this application, module division is an example, and is merely a logical function division. In actual implementation, another division manner may be used.

Figure 11:
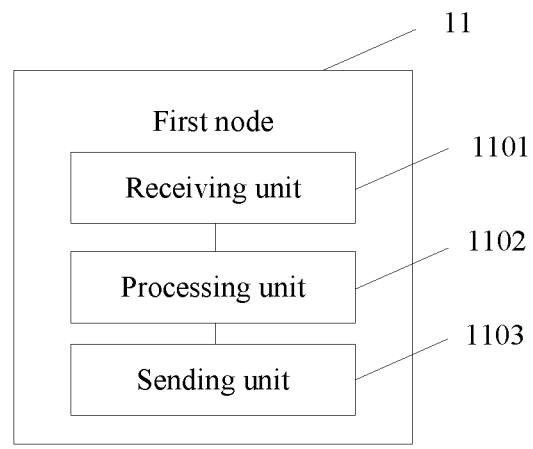
FIG. 11 is a schematic structural diagram of a first node according to an embodiment of this application.

When each function module corresponding to each function is obtained through division, FIG. 11 is a possible schematic structural diagram of a first node 11 according to the foregoing embodiment. The first node includes a receiving unit 1101, a processing unit 1102, and a sending unit 1103. The receiving unit 1101 is configured to support a first node in performing processes 502, 506, and 507 in FIG. 5, processes 702, 706, and 707 in FIG. 7, processes 802 and 805 in FIG. 8, and processes 1002 and 1005 in FIG. 10. The processing unit 1102 is configured to support the first node in performing processes 501, 504, 505, and 508 in FIG. 5, processes 701, 704, 705, and 708 in FIG. 7, processes 801, 804, and 806 in FIG. 8, and processes 1001, 1004, and 1006 in FIG. 10. The sending unit 1103 is configured to support the first node in performing processes 503 and 509 in FIG. 5, processes 703 and 709 in FIG. 7, processes 803 and 807 in FIG. 8, and processes 1003 and 1007 in FIG. 10. All related content of the steps in the foregoing method embodiments may be cited in function descriptions of a corresponding function module. Details are not described herein again.

The processing unit 1102 in FIG. 11 may be a processor, and the receiving unit 1101 and the sending unit 1103 may be integrated into a transceiver. The processing unit 401 in FIG. 4 may be a processor, the communications unit 402 may be a transceiver, and the storage unit 403 may be a memory.

Figure 12:
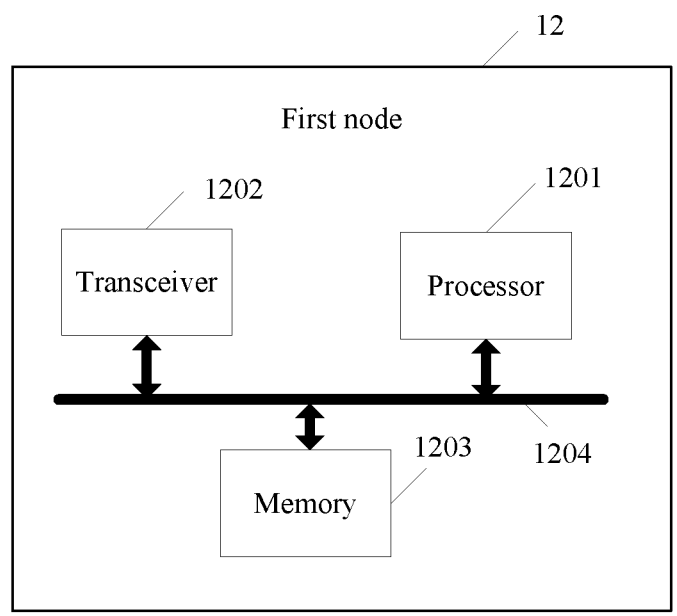
FIG. 12 is a schematic structural diagram of a first node according to an embodiment of this application.

As shown in FIG. 12, a first node 12 includes a processor 1201, a transceiver 1202, a memory 1203, and a bus 1204. The processor 1201, the transceiver 1202, and the memory 1203 are connected to each other by using the bus 1204. The bus 1204 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 12, but this does not mean that there is only one bus or only one type of bus.

An embodiment of the present application further provides a chip, including a memory and a processor. The memory stores code, and when the code is invoked by the processor, the method steps of the first node in the foregoing embodiments can be implemented.

Method or algorithm steps described in combination with the content disclosed in the present application may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or can write information into the storage medium. Certainly, the storage medium may be a component of the processor. The processor and the storage medium may be located in an ASIC. In addition, the ASIC may be located in an interface device of a core network. Certainly, the processor and the storage medium may exist as discrete components in the interface device of the core network.

A person skilled in the art should be aware that in the foregoing one or more examples, functions described in the present application may be implemented by hardware, software, firmware, or any combination thereof. When the present application is implemented by software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a general-purpose or dedicated computer.

The objectives, technical solutions, and benefits of the present application are further described in detail in the foregoing specific implementations. It should be understood that the foregoing descriptions are merely specific implementations of the present application, but are not intended to limit the protection scope of the present application. Any modification, equivalent replacement, or improvement made according to the principle of the present application shall fall within the protection scope of the present application.

What is claimed is:

1. A data forwarding method, comprising:
generating, by a first node in a 5G network, a topology relationship of the first node, wherein the topology relationship of the first node includes one or more identifiers of one or more first-type subnodes and one or more connection statuses between the first node and the one or more first-type subnodes, wherein each first-type subnode of the one or more first-type subnodes connects to a core network by using the first node, and wherein the first node connects to the core network by using a parent node of the first node;
receiving, by the first node from the one or more first-type subnodes, topology relationship information of the one or more first-type subnodes, wherein topology relationship information of a first-type subnode of the one or more first-type subnodes includes one or more identifiers of one or more second-type subnodes and one or more connection statuses between the first-type subnode and the one or more second-type subnodes, and wherein each second-type subnode of the one or more second-type subnodes connects to the core network by using the first-type subnode;
after receiving the topology relationship information of the one or more first-type subnodes, sending, by the first node to the parent node of the first node, the received topology relationship information of the one or more first-type subnodes and the generated topology relationship of the first node;
receiving, by the first node, a first data packet, wherein the first data packet comprises first data and an identifier of a second node of the first data, and wherein the identifier of the second node comprises an identifier of a root node serving user equipment or an identifier of a node that is of the root node and that serves the user equipment;
querying, by the first node, a first route mapping relationship based on the identifier of the second node to determine a third node, wherein the first route mapping relationship comprises a correspondence between the second node and the third node, and wherein the third node is a next-hop node that is indicated in the first route mapping relationship and that the first data packet reaches after passing through the first node; and
forwarding, by the first node, the first data to the third node.

2. The data forwarding method according to claim 1, wherein the method further comprises:
deleting, by the first node, the identifier of the second node of the first data.

3. The data forwarding method according to claim 1, wherein the first data packet is an uplink data packet, and wherein the first node is a node that is of the root node and that serves the user equipment.

4. The data forwarding method according to claim 1, wherein the first data packet is a downlink data packet, and wherein the first node is the root node.

5. The data forwarding method according to claim 1, wherein the method further comprises:
receiving, by the first node, the first route mapping relationship sent by a parent node of the first node, wherein the first route mapping relationship is generated by the root node.

6. The data forwarding method according to claim 1, wherein the first data further comprises transmission path information of the first data, and wherein the transmission path information is used by the first node for further determining the third node.

7. The data forwarding method according to claim 1, wherein the first data packet is an uplink data packet, wherein the first node is a node that is of a root node and that serves the user equipment, and wherein before the determining, by the first node, a third node, the method further comprises:
adding, by the first node, transmission path information of the first data to the first data packet.

8. The data forwarding method according to claim 1, wherein the first data packet is a downlink data packet, wherein the first node is the root node, and wherein before the determining, by the first node, a third node, the method further comprises:
adding, by the first node, transmission path information of the first data to the first data packet.

9. An apparatus, comprising:
at least one processor; and
a non-transitory computer-readable storage medium coupled to the at least one processor and storing programming instructions for execution by the at least one processor, wherein the programming instructions instruct the apparatus to:
generate a topology relationship of the apparatus, wherein the apparatus is a node in a 5G network, wherein the topology relationship of the apparatus includes one or more identifiers of one or more first-type subnodes and one or more connection statuses between the apparatus and the one or more first-type subnodes, wherein each first-type subnode of the one or more first-type subnodes connects to a core network by using the apparatus, and wherein the apparatus connects to the core network by using a parent node of the apparatus;

receive, from the one or more first-type subnodes, topology relationship information of the one or more first-type subnodes, wherein topology relationship information of a first-type subnode of the one or more first-type subnodes includes one or more identifiers of one or more second-type subnodes and one or more connection statuses between the first-type subnode and the one or more second-type subnodes, and wherein each second-type subnode of the one or more second-type subnodes connects to the core network by using the first-type subnode;

after receiving the topology relationship information of the one or more first-type subnodes, send, to the parent node of the apparatus, the received topology relationship information of the one or more first-type subnodes and the generated topology relationship of the apparatus;

receive a first data packet, wherein the first data packet comprises first data and an identifier of a second node of the first data, and wherein the identifier of the second node comprises an identifier of a root node serving user equipment or an identifier of a node that is of the root node and that serves the user equipment;

query a first route mapping relationship based on the identifier of the second node to determine a third node, wherein the first route mapping relationship comprises a correspondence between the second node and the third node, and wherein the third node is a next-hop node that is indicated in the first route mapping relationship and that the first data packet reaches after passing through the apparatus; and forward the first data to the third node.

10. The apparatus according to claim 9, wherein the programming instructions further instruct the apparatus to:
delete the identifier of the second node of the first data.

11. The apparatus according to claim 9, wherein the first data packet is an uplink data packet, and wherein the apparatus is a node that is of the root node and that serves the user equipment.

12. The apparatus according to claim 9, wherein the first data packet is a downlink data packet, and wherein the apparatus is the root node.

13. The apparatus according to claim 9, wherein the programming instructions further instruct the apparatus to:
receive the first route mapping relationship sent by the parent node of the apparatus, wherein the first route mapping relationship is generated by the root node.

14. The apparatus according to claim 9, wherein the first data further comprises transmission path information of the first data, and wherein the transmission path information is used by the apparatus for further determining the third node.

15. The apparatus according to claim 9, wherein when the first data packet is an uplink data packet, the apparatus is a node that is of a root node and that serves the user equipment, wherein when the first data packet is a downlink data packet, the apparatus is the root node, and wherein the programming instructions further instruct the apparatus to:
add transmission path information of the first data to the first data packet before determining the third node based on the transmission path information of the first data.

* * * * *